March 14, 1972 A. J. DURSO ET AL Re. 27,303

COMBINATION BOTTLE AND CLOSURE CAP UNIT THEREFOR

Original Filed Jan. 16, 1969 8 Sheets-Sheet 1

INVENTORS
AUGUST J. DURSO
FRANK C. MAURER
GEORGE A. PANCZYSZYN
BY Charles B. Cannon
Atty

COMBINATION BOTTLE AND CLOSURE CAP UNIT THEREFOR

Original Filed Jan. 16, 1969 8 Sheets-Sheet 2

INVENTORS
AUGUST J. DURSO
FRANK C. MAURER
GEORGE A. PANCZYSZYN
BY Charles B. Cannon
Atty.

COMBINATION BOTTLE AND CLOSURE CAP UNIT THEREFOR

Original Filed Jan. 16, 1969 8 Sheets-Sheet 3

INVENTORS
AUGUST J. DURSO
FRANK C. MAURER
GEORGE A. PANCZYSZYN

BY Charles B. Cannon
Atty

COMBINATION BOTTLE AND CLOSURE CAP UNIT THEREFOR

Original Filed Jan. 16, 1969 8 Sheets-Sheet 4

INVENTORS
AUGUST J. DURSO
FRANK C. MAURER
GEORGE A. PANCZYSZYN
BY Charles B. Cannon
ATTY.

COMBINATION BOTTLE AND CLOSURE CAP UNIT THEREFOR

Original Filed Jan. 16, 1969 8 Sheets-Sheet 5

INVENTORS
AUGUST J. DURSO
FRANK C. MAURER
GEORGE A. PANCZYSZYN
BY Charles B. Cummings
Atty.

COMBINATION BOTTLE AND CLOSURE CAP UNIT THEREFOR

Original Filed Jan. 16, 1969 8 Sheets-Sheet 6

INVENTORS
AUGUST J. DURSO
FRANK C. MAURER
GEORGE A. PANCZYSZYN
BY Charles B. Cannon
Atty COMBINATION BOTTLE AND CLOSURE CAP UNIT THEREFOR
Original Filed Jan. 16, 1969 8 Sheets-Sheet 7
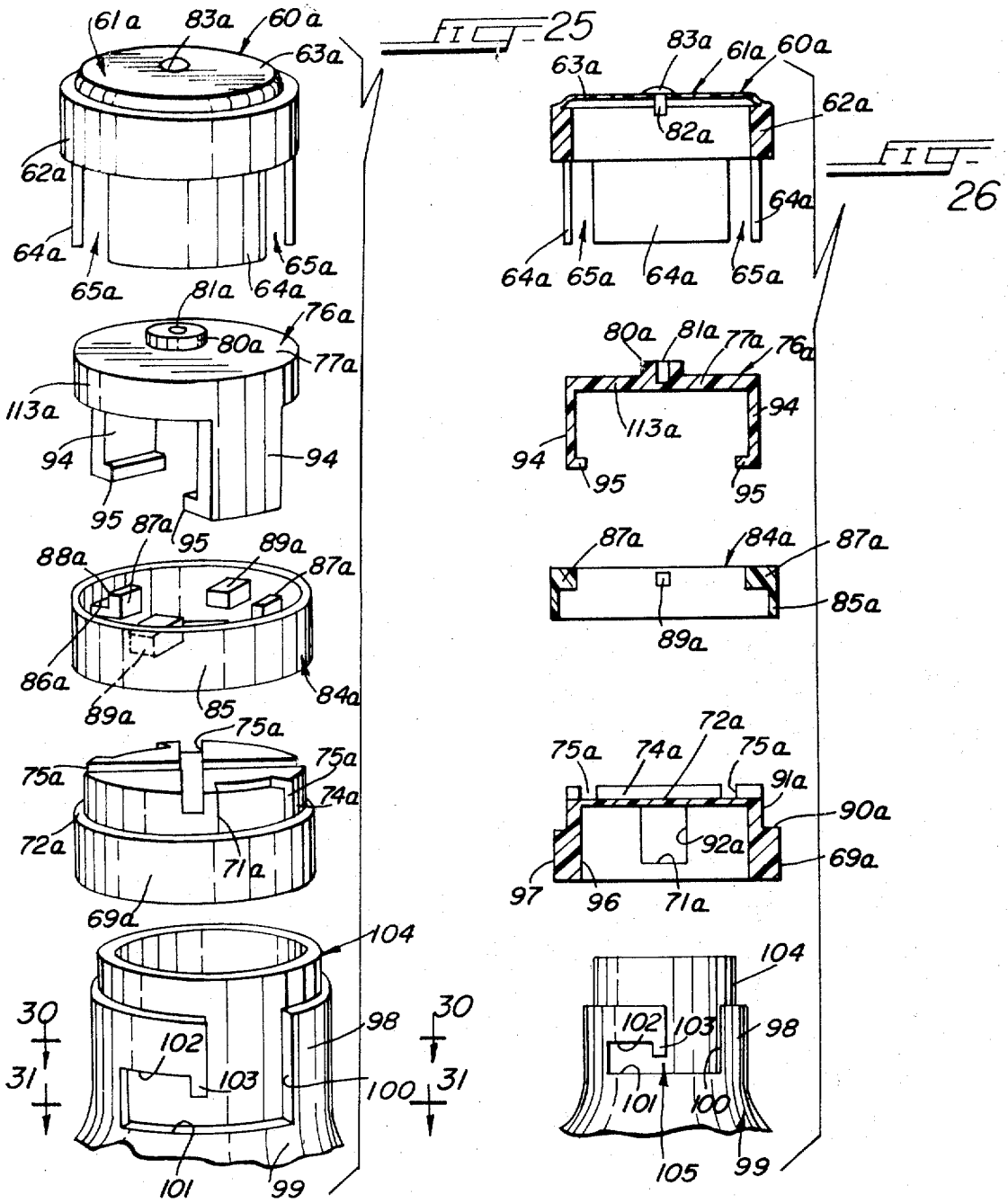
INVENTORS.
AUGUST J. DURSO
FRANK C. MAURER
GEORGE A. PANCZYSZYN
BY Charles B. Cannon
ATTY.

COMBINATION BOTTLE AND CLOSURE CAP UNIT THEREFOR

Original Filed Jan. 16, 1969 8 Sheets-Sheet 8

INVENTORS.
AUGUST J. DURSO
FRANK C. MAURER
GEORGE A. PANCZYSZYN
BY Charles B. Cannon
Atty.

United States Patent Office

Re. 27,303
Reissued Mar. 14, 1972

27,303
COMBINATION BOTTLE AND CLOSURE CAP UNIT THEREFOR

August J. Durso, 1604 Blackthorn Drive, Glenview, Ill. 60025, and Frank C. Maurer, Skokie, and George A. Panczyszyn, Glenview, Ill.; said Maurer and Panczyszyn assignors to said Durso Original No. 3,516,563, dated June 23, 1970, Ser. No. 791,647, Jan. 16, 1969, which is a continuation-in-part of Ser. No. 741,586, July 8, 1968. Application for reissue July 13, 1970, Ser. No. 54,668
Int. Cl. A61j *1/00*
U.S. Cl. 215—9 28 Claims

Matter enclosed in heavy brackets [ ] appears in the original patent but forms no part of this reissue specification; matter printed in italics indicates the additions made by reissue.

ABSTRACT OF THE DISCLOSURE

A combination bottle and closure cap unit therefor are provided which include a bottle for use, among other ways, in holding or packaging liquid or solid medicines, pills, aspirin, and other tablets, capsules, and other materials which may be dangerous to small children and particularly if and when taken in large quantities. The bottle has a neck portion on which the closure cap unit is removably mounted. The closure cap unit and the neck portion of the bottle include coacting attaching means for detachably attaching the closure cap unit to the neck portion of the bottle. The closure cap unit also includes means for restraining movement of the closure cap unit into and out of assembled relationship on the neck portion of the bottle, and manually operable operating means for the restraining means. The closure cap unit likewise includes manually operable control means for the restraining means and for preventing movement of the restraining means independently of the manually operable control means therefor. To remove the closure cap unit from the neck portion of the bottle it is necessary for the operator to use both hands simultaneously, that is, to hold the bottle in one hand and against rotational movement while, at the same time, with the other hand manipulating both the operating means for the restraining means and the control means for the restraining means whereupon the closure cap unit may be removed from the bottle by giving the bottle a partial rotational movement or twist. This makes it impossible or at least extremely difficult for small children to remove the closure cap unit from the neck of the bottle since small children cannot ordinarily use both hands simultaneously in performing such an operation.

This application is a continuation-in-part of copending application, Ser. No. 741,586, filed July 8, 1968, and entitled "Combination Safety Bottle and Closure Cap Therefor," *now abandoned.*

OBJECTS

An object of the present invention is to provide a new and improved combination bottle and closure cap unit therefor which is particularly adapted for use in and for packaging liquid and solid medicines, pills, aspirin and other tablets, capsules, and other materials which may be dangerous to small children and particularly if and when taken in large quantities.

An additional object of the invention is to provide a new and improved combination bottle and closure cap unit therefor which requires the use of both hand simultaneously to remove the closure cap unit from the neck portion of the bottle so that the closure cap unit cannot be removed from the neck portion of the bottle by small children since small children cannot ordinarily use both hand at the same time in performing such an operation.

A further object of the present invention is to provide a new and improved combination bottle and closure cap unit therefor which requires for the removal of the closure cap unit from the neck portion of the bottle that the bottle be held in and by one hand against rotational movement and that, while so holding the bottle in the said one hand, manual pressure be applied simultaneously with the other hand at a plurality of pre-selected points on the external surface of the closure cap housing to release the closure cap unit for movement relative to the neck portion of the bottle and for removal therefrom.

Another object of the present invention is to provide a new and improved combination bottle and closure cap therefor which is tamper-proof against opening by small children.

Other objects will appear hereinafter.

Figure 16:
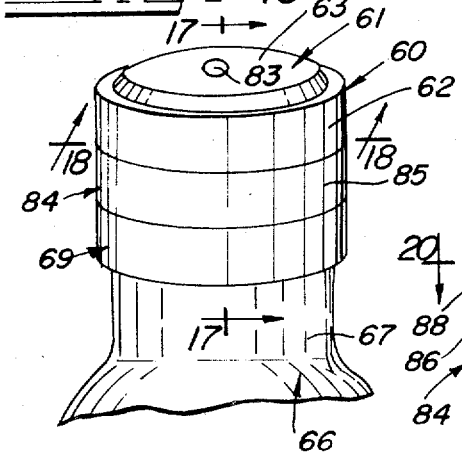
FIG. 16 is a fragmentary perspective view of a preferred embodiment and mode of construction of the new combination bottle and closure cap unit therefor in assembled position.
Figure 17:
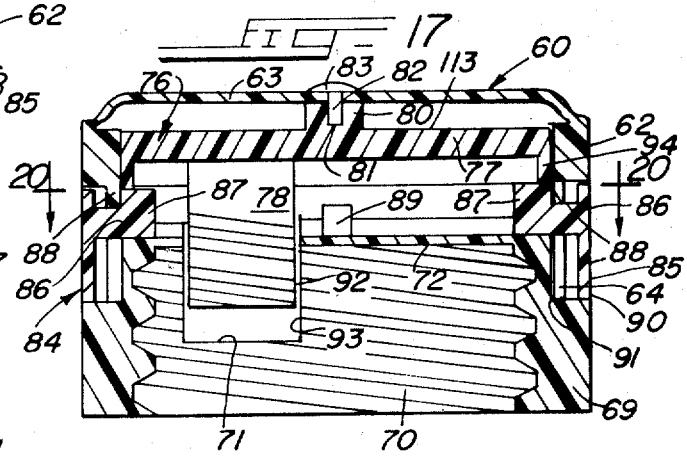
Figure 18:
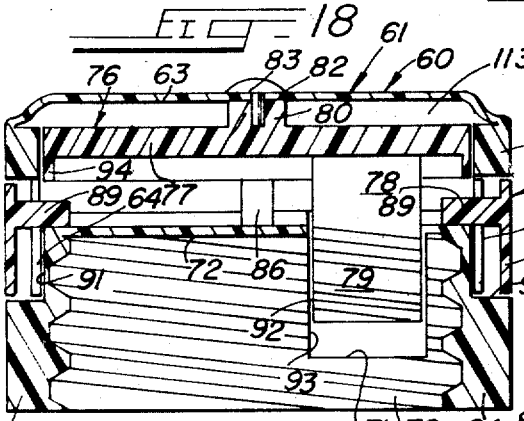
Figure 19:
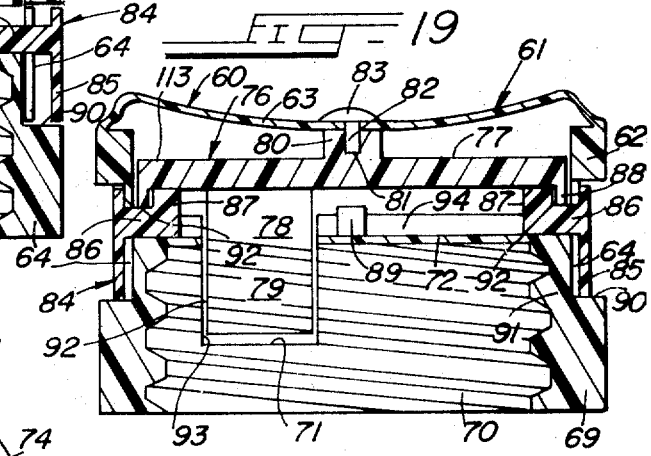
Figure 20:
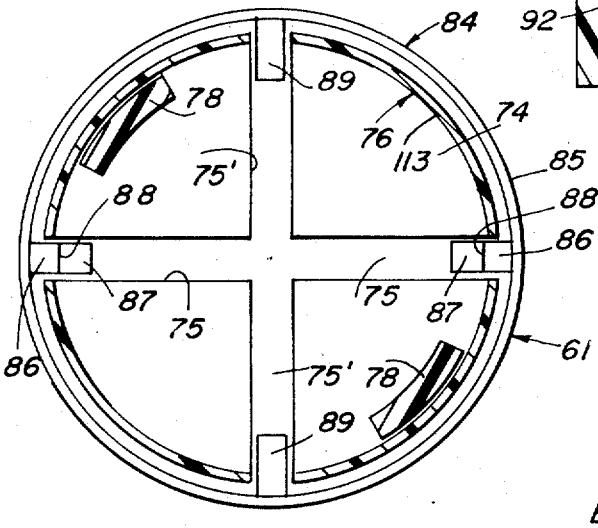
Figure 21:
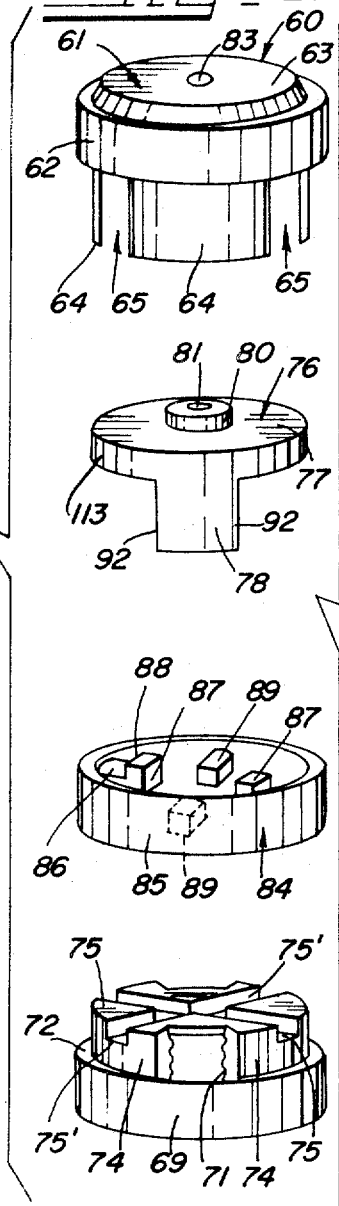
Figure 22:
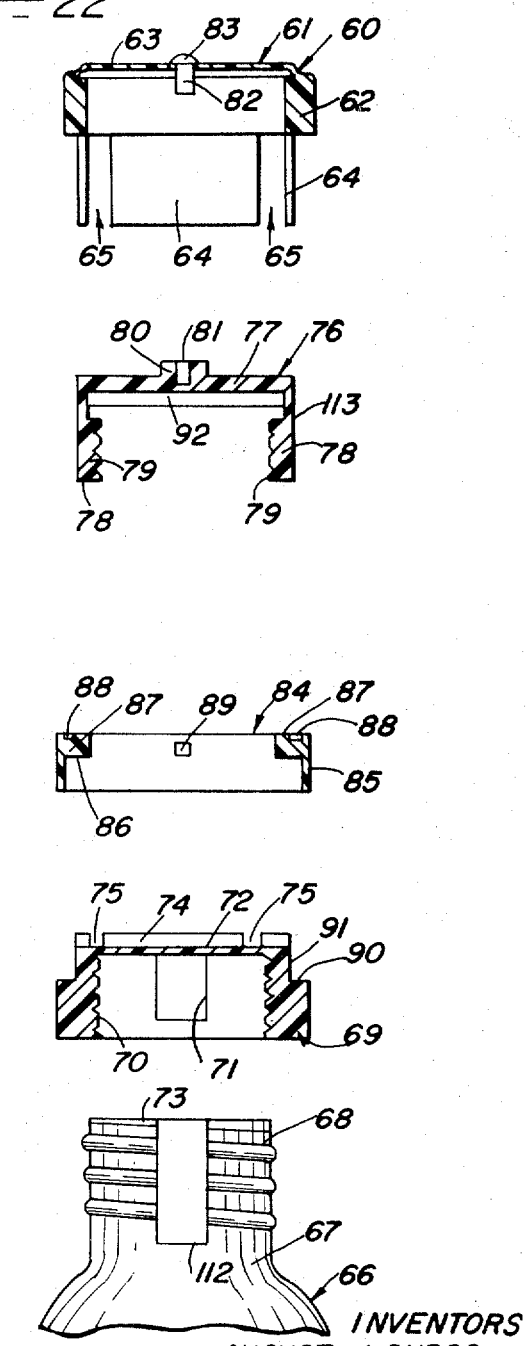
Figure 23:
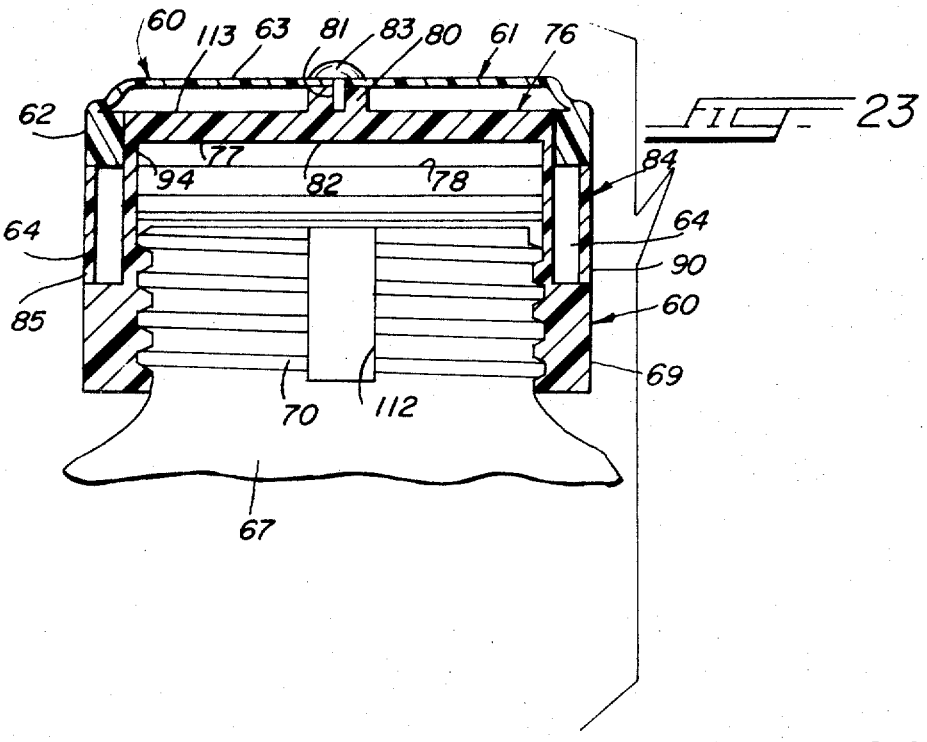
Figure 24:
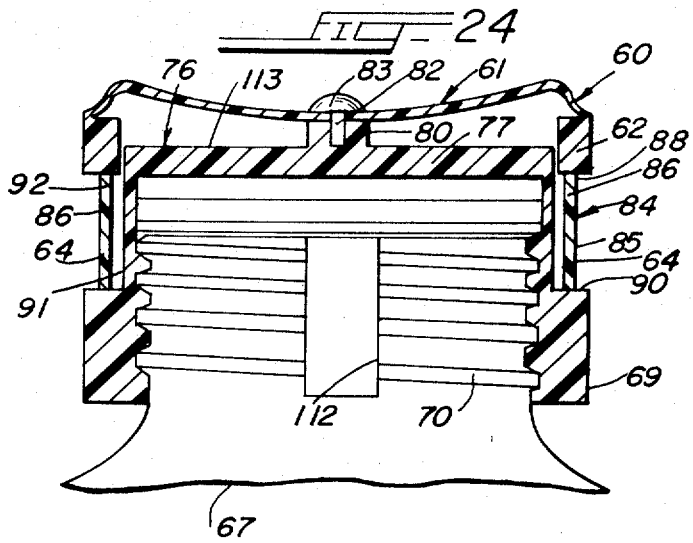
Figure 27:
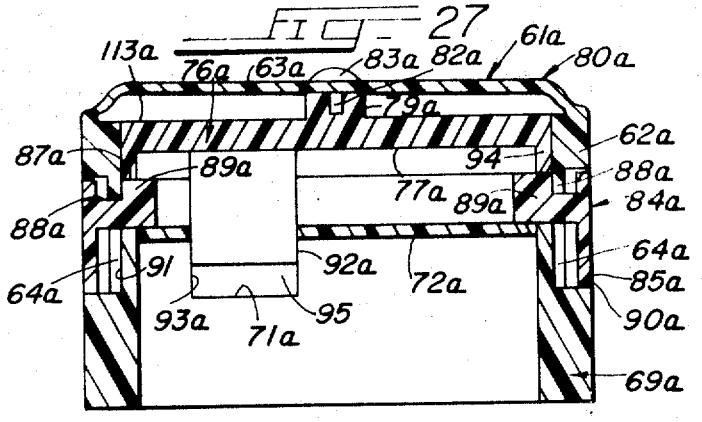
Figure 30:
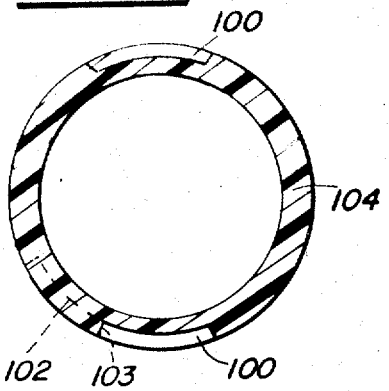
Figure 28:
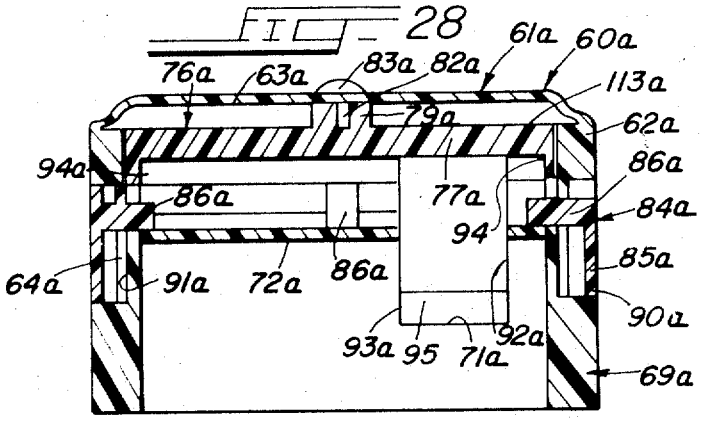
Figure 31:
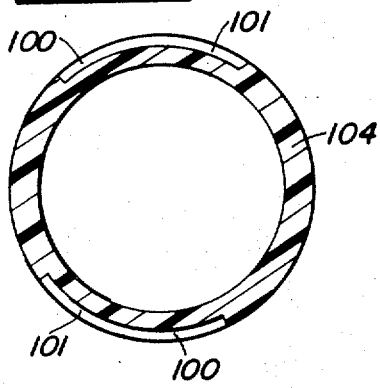
Figure 29:
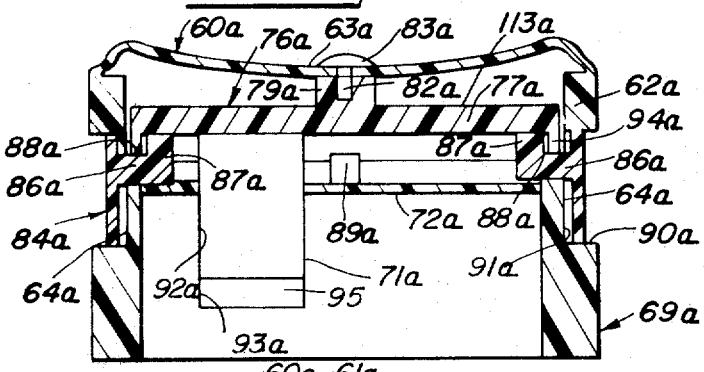
Figure 33:
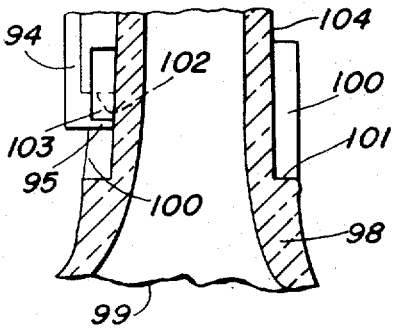
Figure 32:
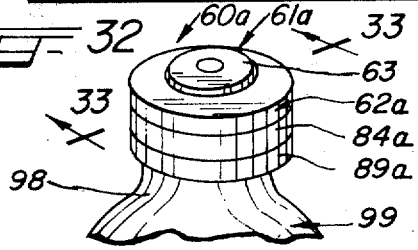

FIG. [16] *17* is a fragmentary perspective view of a preferred sectional view on line 17—17 in FIG. 16;

FIG. 18 is an enlarged fragmentary central vertical sectional view on line 18—18 in FIG. 16;

FIG. 19 is an enlarged fragmentary central vertical sectional view of the closure cap unit shown in FIGS. 16 to 18, inclusive, but showing the parts of the closure cap unit positioned to enable the closure cap unit to be inserted into and detached from the neck portion of the bottle;

FIG. 20 is a sectional top plan view on line 20—20 in FIG. 17;

FIG. 21 is an exploded perspective view of the parts of the new closure cap unit which are embodied in the preferred form and embodiment of the invention illustrated in FIGS. 16 to 24, inclusive;

FIG. 22 is an exploded view showing in section the parts of the closure cap unit which are illustrated in FIG. 21 and also showing the neck portion of the bottle associated therewith;

FIG. 23 is an exploded view, partly in section, of the preferred form of the invention shown in FIGS. 16 to 24 inclusive, showing the closure cap unit and the bottle detached from each other;

FIG. 24 is a sectional view showing the closure cap unit and bottles of FIGS. 16 to 23, inclusive, in assembled position;

FIG. 25 is an exploded perspective view of another modification of the invention;

FIG. 26 is an exploded view showing in section certain of the parts illustrated in FIG. 25;

FIG. 27 is an enlarged central vertical sectional view of the closure cap illustrated in FIGS. 25 and 26;

FIG. 28 is an enlarged central vertical sectional view similar to FIG. 27 but showing the parts of the closure cap unit as seen from a different position;

FIG. 29 is an enlarged central vertical sectional view of the closure cap unit shown in FIGS. 25 to 28, inclusive, but showing the parts of the closure cap unit in position to enable the closure cap unit to be attached to and detached from the neck portion of the bottle;

FIG. 30 is a transverse sectional top plan view on line 30—30 in FIG. 25;

FIG. 31 is a transverse sectional top plan view on line 31—31 in FIG. 25;

FIG. 32 is a fragmentary perspective view showing the closure cap unit illustrated in FIGS. 25 to 31, inclusive, assembled on the neck of the bottle which is embodied in this form of the invention; and FIG. 33 is an enlarged fragmentary sectional view on line 33—33 in FIG. 32.

GENERAL DESCRIPTION

The new combination bottle and closure cap unit therefor comprises, in general, a bottle including a neck portion. A closure cap unit is detachably mounted on the neck portion of the bottle. The closure cap unit and the neck portion of the bottle include coacting attaching means for detachably attaching the closure cap unit to the neck portion of the bottle. The closure cap unit also includes manually operable restraining means for normally restraining movement of the closure cap unit into and out of attachment with the neck portion of the bottle. The closure cap unit further includes manually operable operating means for the restraining means including a manually operable member attached to or forming a part of the top wall of the closure cap housing, and manually operable control means for the restraining means including a plurality of manually operable control members which are positioned at radially spaced intervals on the side wall of the closure cap housing for preventing movement of the said restraining means independently of the said manually operable control means therefor.

In order to remove the closure cap unit from the neck portion of the bottle the operator must hold the bottle in one hand, against rotational movement, and simultaneously, with the other hand, exert manual pressure on the operating means for the restraining means disposed in or on the top wall of the closure cap housing and also at the same time, with the said other hand, exert manual pressure on the manually operable control members for the restraining means located at radially spaced points on the side wall of the closure cap housing and then, while still holding the parts so disposed, impart a partial rotation or twist to the bottle relative to the closure cap unit and thereby detach the closure cap unit from the neck portion of the bottle.

DESCRIPTION OF THE EMBODIMENT SHOWN IN FIGS. 1 TO 10, INCLUSIVE

One embodiment of the new combination safety bottle and closure cap unit therefor is illustrated in FIGS. 1 to 6, 6A, 7 to 9, 9A and 10, inclusive, of the drawings, wherein it is generally indicated at 10, and comprises a closure cap unit 11 and a bottle 12 which, among other uses, are particularly adapted for use in packaging liquid and solid medicines, including pills, aspirin, and other tablets, capsules, and other materials which may be dangerous to small children and especially if and when taken in large quantities. Coacting threaded attaching means are provided on the neck portion of the bottle 12 and on the closure cap unit 11 for detachably attaching the closure cap unit 11 to the neck portion of the bottle 12. Thus the bottle 12 includes an externally threaded neck portion 16 which is provided with circumferentially extending spiral threads 17, and the closure cap unit is provided with coacting threaded attaching means, as will be described hereinafter.

In all forms of the present invention herein described, the bottle 12 and the closure cap unit 11 therefor may be molded of any suitable flexible, resilient synthetic plastic resinous bottle-forming material such, for example, as polyethylene (Tenite) or other suitable plastic resinous material, or other suitable material.

The closure cap unit 11 embodies a closure cap housing 13–14 which includes a dome-shaped top or cap portion 13 and a generally cylindrical body portion 14 on which the dome-shaped top or cap portion 13 is mounted. The dome-shaped top or cap portion 13 may be permanently secured to the generally cylindrical body portion 14 in any suitable manner, as by fusing or adhesively connecting it thereto. The body portion 14 has a generally cylindrical-shaped internal cavity 40 therein for the reception of the threaded neck portion 16 of the bottle 12, and the upper end portion of the internal cavity 40 is closed by a top wall 39. The generally cylindrical internal cavity 40 in the body portion 14 of the closure cap housing 13–14 is provided with circumferentially extending and spirally arranged threads 15 which are complementary to the threads 17 on the externally threaded neck portion 16 of the bottle 12 and coact with the threads 17 as coacting attaching means for detachably attaching the closure cap unit 11 to the neck portion 16 of the bottle 12.

The dome-shaped top or cap portion 13 of the closure cap housing 13–14 has a centrally arranged opening 18 formed in the apex thereof and a manually operable push button operating member 19 is slidably mounted in the opening 18 and serves as an operating means for manually operable restraining means, which is embodied in the closure cap unit 11, for restraining the closure cap unit 11 and the bottle 12 from being attached to and detached from each other, as will be described more fully hereinafter.

The manually operable restraining means, referred to above, includes a generally U-shaped movable restraining member 20, which may be molded of any suitable flexible, resilient synthetic plastic resinous or other material, and the restraining member 20 includes a pair of spaced depending restraining arm members 21 which are internally threaded, as at 22. These depending restraining arm members 21–22 project downwardly through and work in slots or openings 38 which are formed in the top wall 39 of the generally cylindrical body portion 14 of the closure cap housing 13–14 and they project into the interior of the said body portion 14 of the closure cap housing 13–14 so as to match the internal threads 22 on the depending threaded restraining arm members 21–22 of the U-shaped restraining member 20 with the internal threads 15 in the internal cavity 40 of the body portion 14, as will be described more fully hereinafter.

The generally U-shaped restraining member 20 is normally urged upwardly and outwardly of the dome-shaped closure cap member 13 of the closure cap unit 11, into effective or restraining position, that is, axially relative to the longitudinal axis of the bottle 12 and its neck portion 16, by resilient means in the form of a coil spring 23 which is arranged within the dome-shaped top portion 13 of the closure cap housing 13–14. The upper end portion of the coil spring 23 seats against a boss 24 which is formed on the inner surface of the U-shaped restraining member 20 (FIG. 4) and the lower end portion of the coil spring 23 is seated in a recess 25 which is formed in the upper surface of guide means in the form of a guide member or guide block 26 which is formed on the upper surface of, and as an internal part of, the generally cylindrical body portion 14 of the closure cap housing 13–14.

Figure 1:
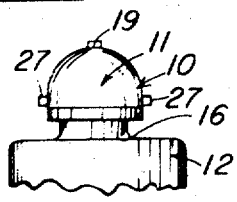
FIG. 1 is a fragmentary elevational view of one form of the new combination bottle and closure cap unit therefor.
Figure 2:
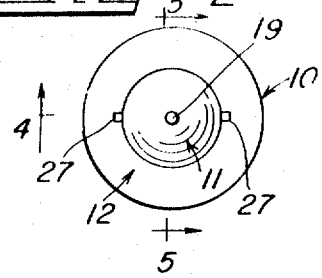
FIG. 2 is a top plan view of the new combination bottle and closure cap unit shown in FIG. 1.
Figure 3:
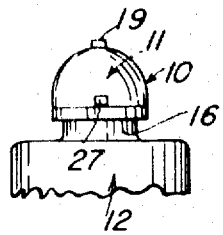
FIG. 3 is a fragmentary side elevational view of the new combination bottle and closure cap therefor shown in FIGS. 1 and 2, as seen from the right hand side in FIG. 1.
Figure 4:
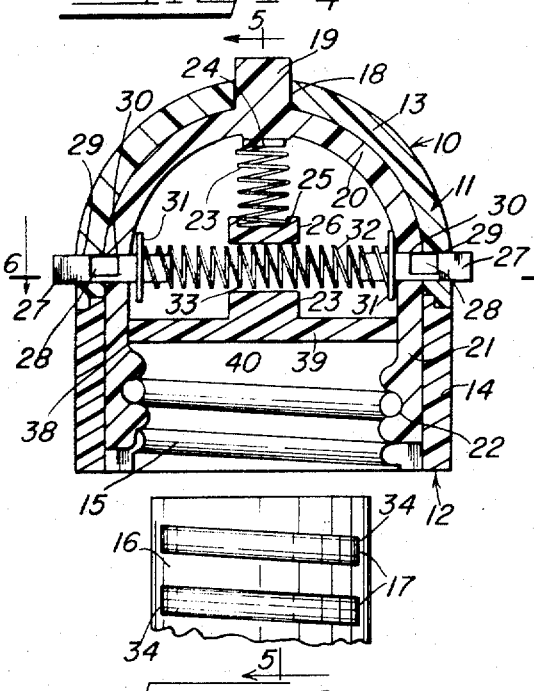
FIG. 4 is an enlarged central vertical sectional view, on line 4—4 in FIG. 2, showing the threaded neck portion of the bottle and showing the closure cap unit therefor detached from the neck of the bottle.
Figure 6:
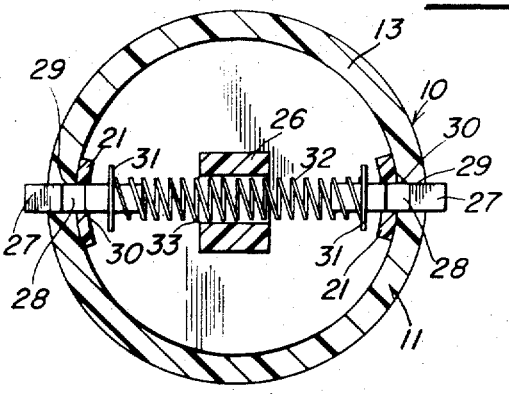
FIG. 6 is a sectional view on line 6—6 in FIG. 4.
Figure 6A:
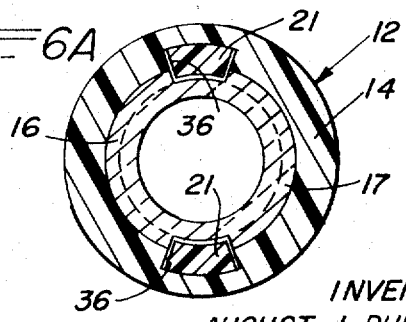
FIG. 6A is a sectional top plan view on line 6A—6A in FIG. 5 but showing the closure cap unit attached to the neck of the bottle.
Figure 7:
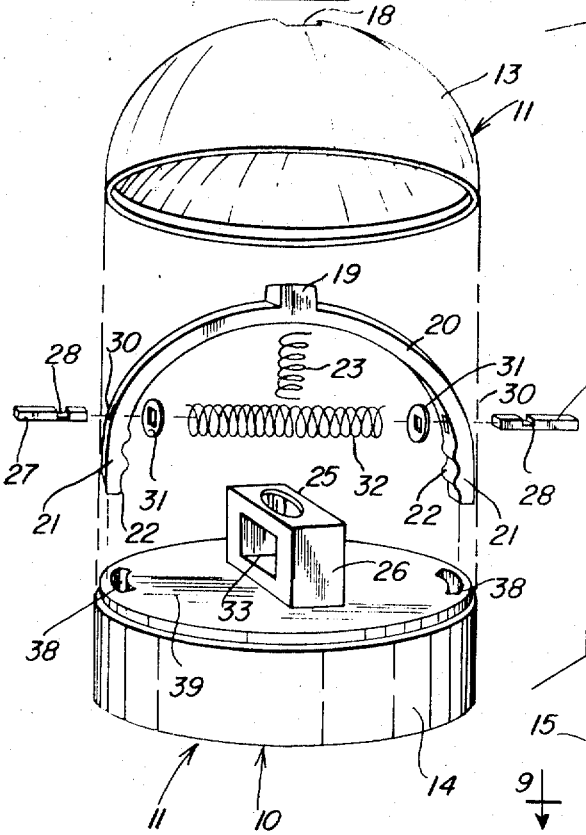
FIG. 7 is an exploded perspective view of the parts embodied in the form of the new combination bottle and closure cap unit therefor shown in FIGS. 1 to 10, inclusive.

The closure cap unit 11 also includes manually operable control means for manually controlling movement of the restraining means 20–21–22 independently of the control means therefor. In the embodiment of the invention shown in FIGS. 1 to 10, inclusive, the manually operable control means for the restraining means 20–21–22 comprises a pair of laterally extending manually operable slidable control members 27 each of which has a recess 28 formed in its upper surface. These manually operable slidable control members 27 are arranged at radially spaced intervals of preferably 180°, or at other suitable radial intervals, as may be desired, on the periphery of the closure cap housing 13–14, and project through and are slidably mounted in openings 29 which are formed in the side wall of the dome-shaped top or cap portion 13 of the closure cap housing 13–14 (FIGS. 4 and 6). In addition, the manually operable slidable control members 27 also project through and are slidably mounted in corresponding aligned openings 30 which are formed in the depending arms 21 of the generally U-shaped restraining member 20 (FIGS. 6 and 7). Abutment washers 31 are mounted on the slidable control members 27, within the generally U-shaped restraining member 20. Resilient means in the form of a coil spring 32 extends between the abutment washers 30 and is arranged in a guideway 33 which extends transversely through the guide member or guide block 26, for normally urging the slidable control members 27 radially outwardly relative to the peripheral surface of the closure cap housing 13–14.

Figure 5:
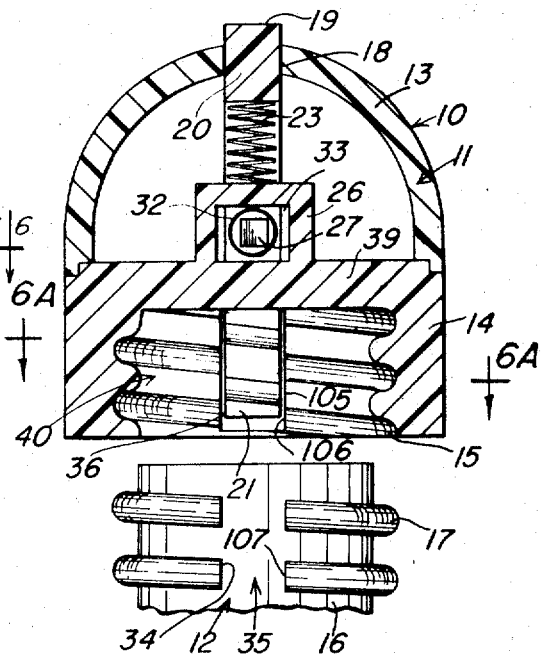
FIG. 5 is a central vertical sectional view on line 5—5 in FIG. 4.
Figure 8:
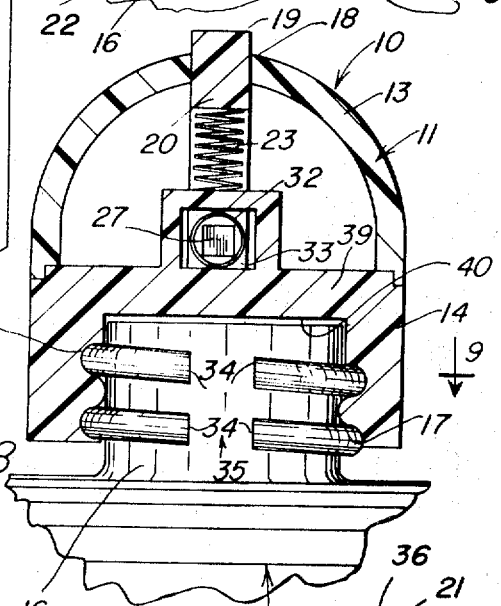
FIG. 8 is a central vertical sectional view, partly in elevation and similar to FIG. 5, but showing the closure cap unit assembled on the threaded neck portion of the bottle.

As shown in FIGS. 5 and 8, the external threads 17 on the neck portion 16 of the bottle 12 are interrupted on opposite sides thereof, that is, at radical intervals of preferably 180° or at other pre-selected radial intervals relative to the periphery of the neck portion 16 of the bottle 12, as at 34, to provide a pair of guideways or slots 35 for the reception and passage of the internally threaded depending restraining arm members 21–22 of the generally U-shaped restraining member 20, for reasons which will be pointed out hereinafter.

Similarly, the internal threads 15 in the internal cavity 40 of the body portion 14 of the closure cap housing 13–14 are interrupted, as at 36, at radially spaced intervals of 180° or other suitable selected radial intervals, to provide guideways or slots 37 for the passage of the depending restraining arms 21 of the generally U-shaped restraining member 20 (FIG. 5); it being noted that the pairs of guideways or slots 35 and 37 are spaced at corresponding radial intervals so that they will be aligned with each other when the closure cap unit 11 is positioned on the neck portion 16 of the bottle 12.

OPERATION OF THE EMBODIMENT SHOWN IN FIGS. 1 TO 10, INCLUSIVE

Figure 10:
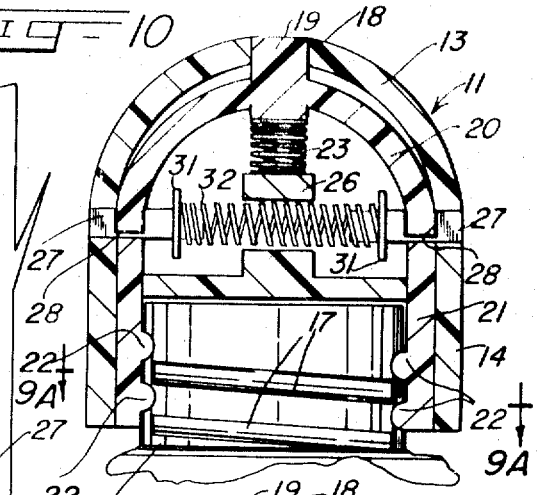
FIG. 10 is a fragmentary central vertical sectional view showing the neck portion of the new combination bottle and the closure cap unit therefor in assembled position.

The use and operation of the embodiment of the new combination bottle and closure cap unit therefor shown in FIGS. 1 to 10, inclusive, of the drawings are as follows:

To install the closure cap unit 11 on the externally threaded neck portion 16–17 of the bottle 12, the closure cap unit 11 is arranged over the threaded neck portion 16 of the bottle 12 while holding the bottle 12 in one hand. With the other hand, the manually operable push button operating member 19 for the generally U-shaped restraining members 20–21–22, and the manually operable slidable control members 27 are then manually pressed inwardly simultaneously into the positions in which the parts are shown in FIG. 10 while, at the same time, the entire closure cap unit 11 is moved downwardly onto the threaded neck portion 16–17 of the bottle 12. As the manually operable push button operating member 19 and attaching restraining members 20–21–22 are thus manually depressed into the position in which the parts are shown in FIG. 10, the internal threads 22 on the restraining arm members 21 come into registration and mating relationship with the internal threads 15 in the internal cavity 40 of the body portion 14 of the closure cap housing 13–14 so that the threads 22 on the restraining arm members bridge the slots or interruptions 36 in the threads 15 and form, in effect, continuations of the threads 15.

While still manually pressing inwardly or downwardly on the manually operable push button operating member 19 for the generally U-shaped restraining members 20–21–22, the slidable manual control members 27—27 are pressed radially inwardly and the threaded neck portion 16–17 of the bottle 12 is manipulated into threaded engagement with the internally threaded cavity 40 of the body portion 14 of the closure cap housing. During this operation the depending restraining arm members 20–21–22 are received in the slots or passageways 35 formed by the interruptions in the threads 17 of the bottle neck 16, whereupon the internal threads 15 in the cavity 40 of the body portion 14 of the closure cap housing 13–14 and their mating extensions formed by the internal threads 22 on the restraining arm members 21–22 may be engaged with the external threads 17 on the bottle neck 16 by imparting a partial rotation or twist to the bottle 12, with one hand, while holding the closure cap unit 11 against rotation with the other hand, thereby attaching the entire closure cap unit 11 on and to the neck portion 16—16 of the bottle 12 by the coacting attaching means 15–22–17, whereupon the parts appear as in FIG. 10.

Figure 9:
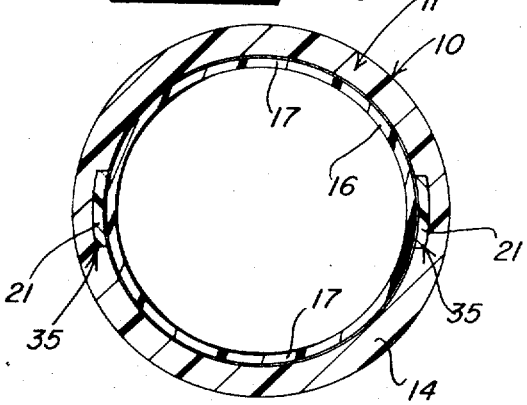
FIG. 9 is a sectional top plan view on line 9—9 in FIG. 8.

When the closure cap unit 11 is thus attached to the neck portion 16–17 of the bottle 12 and manual pressure on the push button operating member 19 for the restraining members 20–21–22, and manual pressure on the slidable control members 27—27 is released, these parts are returned to their normal positions, as in FIGS. 8 and 9, with the closure cap unit 11 attached to the neck portion 16–17 of the bottle 12.

In this manner the closure cap unit 11 is securely attached to the externally threaded neck portion 16–17 of the bottle 12 and against undesired removal therefrom by small children since to remove the closure cap unit 11 from the neck portion 16–17 of the bottle 12 requires the use of both hands simultaneously, as will now be described, and such an operation cannot normally be done by small children.

The operation of removing the closure cap unit 11 from the neck portion 16–17 of the bottle 12 is as follows: While holding the bottle 12 in one hand, against rotational movement, and holding the closure cap unit 11 in the other hand, the manually operable push button operating member 19 for the generally U-shaped restraining members 20–21–22 and the slidable manually operable control members 27—27, are manually and simultaneously pressed inwardly with the said other hand, against the action of the resilient means in the form of the coil springs 23 and 32, respectively. The bottle 12 is then manually given a partial rotation or twist, with the said one hand, relative to the closure cap unit 11, so as to bring the depending internally threaded restraining arm members 21–22–23 of the generally U-shaped restraining member 20 into alignment or registry with the aligned pairs of guideways or slots 35 and 37. The entire closure cap unit 11 may then be lifted upwardly off the neck portion 16–17 of the bottle 12. During this operation the depending restraining arm members 21–22–23 of the generally U-shaped restraining member 20 pass through the aligned pairs of guideways or slots 35 and 37, whereupon the resilient means or springs 23 and 32 return the manually operable push button member 19 and attached restraining means 20–21–22 and the manually operable control members 27—27, respectively, to their normal positions, as in FIGS. 4, 5 and 6.

It will be noted that the restraining means 20–21–22 cannot be manipulated independently of the manually operable control means 27–28–31–32, etc., therefor, and that the closure cap unit 11 cannot be removed from the externally threaded neck portion 16–17 of the bottle 12 except by holding the bottle 12 in one hand, against rotational movement, and simultaneously, with the other hand, holding the closure cap unit 11 and manipulating both the manually operable push button operating means 19 for the restraining means 20–21–22 and the control means 27–28–31–32, etc., therefor, with the said other hand, as described above. This is an operation which cannot be performed by small children since it is well-known that small children cannot ordinarily perform operations which call for the simultaneous use of both hands. Hence the bottle 12 and the closure cap unit 11 therefor are tamper-proof against opening by small children.

Figure 9A:
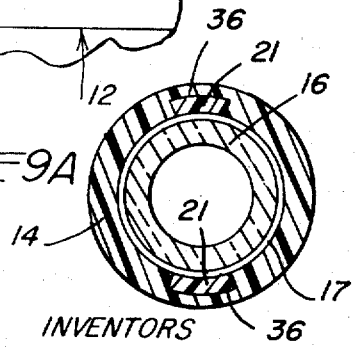
FIG. 9A is a sectional top plan view on line 9A—9A in FIG. 10.

It will be noted that when the closure cap unit 11 is attached to the neck portion 16–17 of the bottle 12, and the parts are disposed as in FIGS. 8 and 9A, any attempt to remove the closure cap unit 11 from the threaded neck portion 16–17 of the bottle 12, by a twisting or rotational movement, without operating the manually operable push button member for the restraining means 20–21–22 and the manually operable control members 27—27 for the restraining means 20–21–22, will merely result in moving the side walls 105 or edges 106 of the restraining arm members 21–22, which are then disposed in the aligned slots or passageways 35–36 as in FIGS. 8 and 9A, into abutting engagement with the adjacent edges 106 of the interrupted threads 15 in the internal cavity 40 of the body portion 13–14 of the closure cap housing 13–14, thereby restraining and preventing the closure cap unit 11 from being detached from the neck portion 16 of the bottle 12.

DESCRIPTION OF THE EMBODIMENT SHOWN IN FIGS. 11 to 15, INCLUSIVE

Another embodiment of the invention is illustrated in FIGS. 11 to 15, inclusive, and comprises a closure cap unit, generally indicated at 41, and which includes a closure cap housing having a generally cylindrical closure body portion 42 and a dome-shaped top or cap portion 43 integral therewith.

The side wall of the closure cap housing 42–43 has a pair of reduced relatively thin, flexible, resilient side wall portions 44, which are spaced at radial intervals of preferably 180°, or other suitable radial intervals, on the periphery of the closure cap housing 42–43, for reasons which will be pointed out presently.

The generally cylindrical closure cap housing 42–43 has a generally cylindrical internal cavity 45 therein and the closure cap unit 41 and its housing 42–43 include a generally cylindrical closure body portion 46 which fits within the internal cavity 45 and is provided with internal circumferentially extending spiral threads 47.

The closure cap unit 41 includes restraining means, generally indicated at 48, arranged within the closure cap housing 42–43–45 for restraining the closure cap unit 41 and the generally cylindrical internally threaded closure body portion 46–47 arranged therein from being attached to and detached from the externally threaded neck portion 16–17 of the bottle, as 12, such as shown in FIGS. 1, 3, 4 and 5 of the drawings, except when the manually operable control means for the restraining means is opened simultaneously therewith, as will be described more fully hereinafter.

The restraining means 48 includes a pair of diverging resilient restraining arm members 49—49 which are joined at an apex portion 50 which is integrally connected, as at 51, to their upper ends, by a flexible resilient top wall portion 54 of the closure cap housing 42. Each of the flexible resilient restraining arm members 49—49 has a relatively narrow depending portion or extension 52, and these depending portions or extensions 52 of the restraining arm members 49 are spaced preferably at radial intervals of approximately 180°, or at other suitable radial intervals, and are provided with internal threads 53 which correspond to and are adapted to mate with the internal threads 47 on the inner periphery of the internal cavity of the generally cylindrical closure body portion 46–47.

Figure 11:
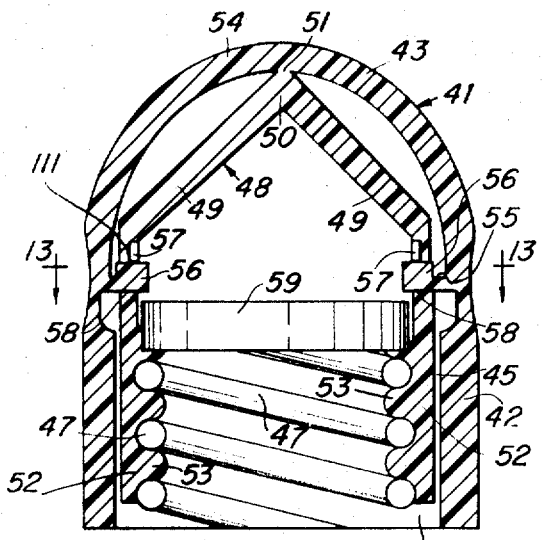
FIG. 11 is a central vertical sectional view of another embodiment of the new combination bottle and closure cap unit therefor.
Figure 12:
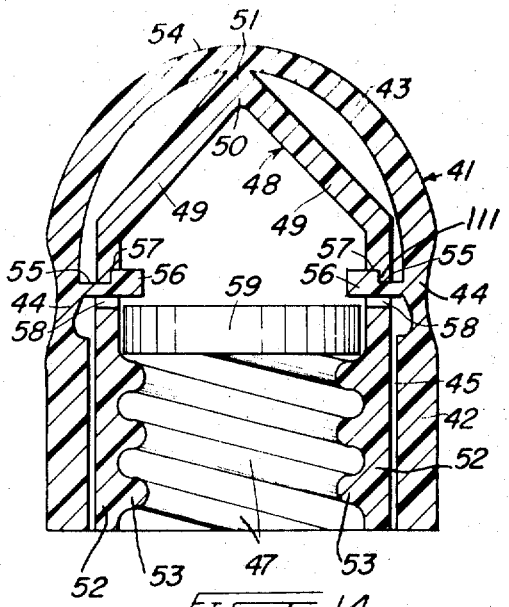
FIG. 12 is a central vertical sectional view similar to FIG. 11 but showing the parts in a different position.
Figure 13:
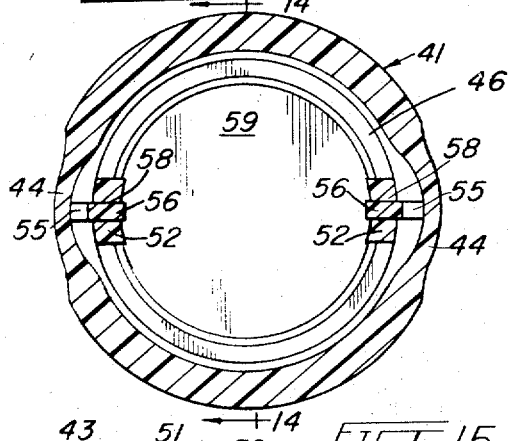
FIG. 13 is a sectional top plan view on line 13—13 in FIG. 11.

The closure cap unit 41 also includes manually operable control means for controlling movement of the restraining means 48–49–52–53. To this end, as best shown in FIGS. 11, 12 and 13, each of the relatively narrow flexible, resilient side wall control portions 44 of the closure cap housing 42–43 has an inwardly projecting control arm member 55 formed integral therewith on its inner wall surface. Each of these control arm members 55 projects generally right-angularly radially inwardly and terminates in an enlarged inner end or head portion 56, and a recess 57 formed in each of the depending restraining arm members or extensions 52 is adapted to receive the correspondingly shaped head portion 56 of one of the control arm members 55. Each of the recess 57 has a radially outer side wall 111 (FIGS. 11 and 12). Each of the control arm members 55–56 also projects through and is slidable in a slot or opening 58, one of which is formed in each of the depending portions or extensions 52 of the restraining arm members 49 (FIGS. 11, 12 and 13).

The internal threads 47 in the generally cylindrical body portion 46 of the closure cap housing 42–43 are interrupted at intervals spaced preferably 180° apart thereon, or at other suitable spaced radial intervals, thereby providing passageways or slots 108 for the passage of the depending threaded restraining arm members 52–53. These interruptions in the internal threads 47 of the closure cap body member 46 also provide inner end edge portions 109 on the internal threads 47 of the closure body portion 46 against which side marginal edge portions 110 (FIG. 14) of the restraining arm members 52–53 are adapted to abut, as will be described more fully hereinafter.

A disc-shaped closure seal cap member 59, which may also be formed of any suitable synthetic molding resin material, or other suitable material, is mounted in the upper end portion of the generally cylindrical internally threaded closure body member 46 for sealing the closure cap unit 41 onto the neck portion 16 of a bottle, as 12 (FIGS. 1 to 5, inclusive).

As will be explained hereinafter, the flexible, resilient top wall 43 of the closure cap housing 42–43 provides a manually operable operating means for the restraining means 48–49–52–53 and the flexible side wall portions 44 of the closure cap housing 42–43 and attached control arm members 55–56, provide manually operable control members for the restraining means 48–49–52–53 and for preventing movement of the restraining means 48–49–52–53 independently of the control means 44–56 therefor, as will be described hereinafter.

OPERATION OF THE EMBODIMENT SHOWN IN FIGS. 11 TO 15, INCLUSIVE

The use and operation of the form or the embodiment of the invention shown in FIGS. 11 to 15, inclusive are as follows:

When the parts of the closure cap unit 41 are assembled, as shown in FIG. 11, the internal threads 53 on the depending arms 49–52 are disposed in threaded engagement with the internal threads 47 on the generally cylindrical body portion 46 of the closure cap housing 42–43. Hence, any attempt to attach the closure cap unit 41 to the neck portion 16–17 of a bottle, as 12, by attempting to rotate it onto the externally threaded neck portion 16 of the bottle, as 12 (FIGS. 1 to 5, inclusive), will be prevented by the threads 53 on the restraining arms 52–53.

Hence, in order to attach the closure cap unit 41 onto the externally threaded neck portion, as 16–17 of a bottle, as 12, such as is shown in FIGS. 1 to 5, inclusive, the user must hold the bottle 12 in one hand, against rotational movement while, at the same time, with the other hand, holding the closure cap unit 41 and pressing downwardly on the manually operable operating means for the restraining means 48–49–52–53, that is, on the resilient top wall portion 54 of the closure cap housing 42–43 while, simultaneously therewith, with the said other hand, manually pressing radially inwardly on the two relatively thin flexible, resilient side wall control portions 44 of the closure cap housing 42–43 and their attached control arm members 46.

When the flexible, resilient side wall control portions 44 are thus manually pressed radially inwardly the control members 55–56 attached thereto are moved radially inwardly in the slots 58 in the depending extensions 52 of the restraining arm members 49 and, as manual pressure is applied at and upon the resilient operating top wall portion 54 of the closure cap housing 42–43, the slightly flexible, resilient diverging restraining arm members 49 and their depending extensions 52–53, are forced downwardly so that portions of the enlarged heads 56 on the control arm members 55 seat in the recesses 57 which are provided in the depending extensions 52 of the resilient restraining arm members 49. This downward or inward movement of the resilient restraining arm members 49 and their depending extensions 52 causes the internally threaded portions 53 of the depending extensions 52 of the resilient restraining arm members 52 to move downwardly in the slots 108 formed by the interruptions in the internal threads 47 in the body portion 46 of the closure cap housing 42–43 and in the slots, as 35, formed in the external threads 17 on the neck portion of a bottle, as 12 (FIGS. 1 to 5, inclusive), and during this operation the flexible, resilient restraining arms 52–53 flex radially inwardly so as to allow the internal threads 53 on the restraining arm members 52 to move into mating relationship with and to form, in effect, continuations of the internal threads 47 in the internal cavity in the body portion 46 of the closure cap housing 41–42. At this time the external threads 53 on the restraining arms 52–53 bridge the slots or passageways 109 formed by the interruptions in the threads 47, and the parts of the closure unit 41 assume the position in which they are shown in FIG. 17.

When the parts of the closure cap unit 41 are so disposed and while still holding the parts as described above, the bottle 12 and its externally threaded neck portion, as 16–17, may be given a partial revolution or twist, relative to the closure cap unit 41, thereby engaging the external threads, as 17, on the neck portion 16 of the bottle 12, with the internal threads 47 in the internal cavity of the body portion 46 of the closure cap housing 42–43, and thus enabling the closure cap unit 41 to be attached to the neck portion 16 of the bottle 12, by the coacting threaded attaching means 47–53 and 17.

It will be noted, in this connection, that when the restraining arm members 49–52–53 are thus moved into position, as in FIG. 17, the internal threads 53 on the depending extensions 52 of the restraining arm members 49 serve, in effect, as a part of the coacting threaded attaching means 47–53 and 17 on the closure cap unit 41 and on the neck portion 16 of the bottle 12, respectively, for detachably attaching the closure cap unit 41 to the neck portion 16 of the bottle 12.

When the new closure cap unit 41 is thus mounted on the neck portion 16–17 of the bottle 12, as described above, the closure seal 59 provides an air and liquid tight seal between the closure cap unit 41 and the neck portion 16 of the bottle 12.

Figure 14:
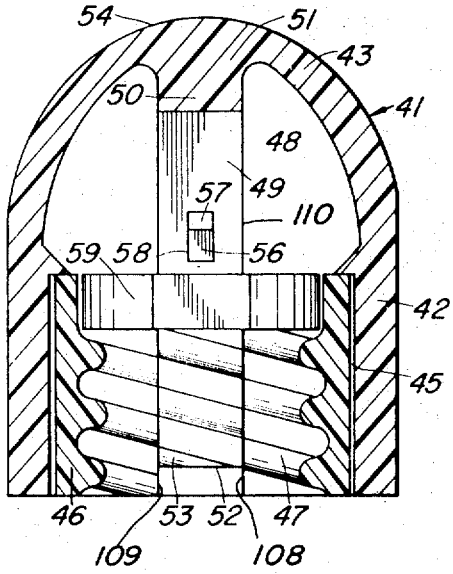
FIG. 14 is a central vertical sectional view on line 14—14 in FIG. 13.
Figure 15:
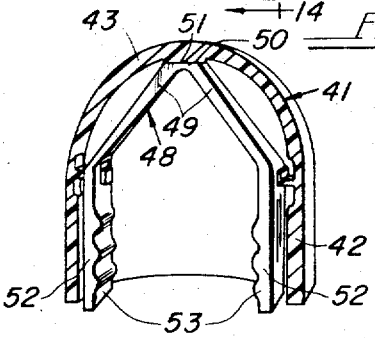
FIG. 15 is a central vertical sectional view, partly in elevation, of certain of the parts embodied in the form of the new closure cap unit shown in FIGS. 11 to 14, inclusive.

In order to remove the closure cap unit 41 from the neck portion 16 of the bottle 12 the user, while holding the bottle 12–16 in one hand, and the closure cap unit 41 in the other hand, manually presses downwardly on the resilient operating top wall portion 54 of the closure cap housing 42–43, and such manual pressure acts to force the slightly flexible, resilient diverging restraining arm members 49, and their depending extensions 52–53 downwardly. At the same time the user, with the said other hand, presses radially inwardly on the two resilient side wall control portions or so-called "pressure points" 44 on the side wall of the closure cap housing 42–43 while, at the same time giving the bottle 12 a partial twist or rotation with the said one hand. During this operation the control arm members 55–56 are forced radially inwardly in the slots 58 in the depending portions or extensions 52 of the resilient restraining arm members 49 and the recessed portions 57 in the depending extensions 52–53 are moved upwardly, under the force of the innate resiliency of the top wall portion 54 of the closure cap housing 42–43, as the flexible, resilient top wall portion 54 of the closure cap housing 42–43 returns to its normal position, as in FIGS. 11, 13 and 14. During this operation the enlarged heads 56 on the control arm members 55–56 clear the radially outer side walls 111 of the recesses 57 as the manually operable control members 55–56 return to their normal position, as in FIGS. 11 and 13, under the force of the innate resiliency of the flexible, resilient side wall control portions 44 of the closure cap housing 42–43. Hence, when manual pressure on the resilient side wall control portions, or so-called "pressure points" 44, is released the parts will assume their initial position in which they are shown in FIGS. 11, 13 and 14. During this operation the partial twist or rotary motion imparted to the bottle 12–16, by the said one hand, moves the slots or passageways 35 in the external threads 17 of the neck 16 of the bottle 12 into registry with the slots or interruptions 108 in the internal threads 47 in the body portion 46 of the closure cap housing 42–43 and also in registry with the threaded depending extensions 52–53 of the restraining arm members 49 so that the closure cap unit 41 may then be removed from the neck portion 16–17 of the bottle 12.

DESCRIPTION OF THE PREFERRED EMBODIMENT SHOWN IN FIGS. 16 TO 24, INCLUSIVE

A preferred embodiment and mode of construction of the invention is illustrated in FIGS. 16 to 24, inclusive, of the drawings, wherein it is generally indicated at 60, and comprises a closure cap unit 61.

The closure cap unit 61 includes a closure cap housing which includes a top or cap portion 62 having a relatively thin flexible, resilient top wall 63, and a plurality of radially spaced arms 64 which are formed integral with and depend from the top or cap portion 62 at the radially inner side of the latter so that radially spaced slots 65 are provided between the depending arms 64 (FIGS.

21 and 22). The combination bottle and closure cap unit 60 shown in FIGS. 16 to 24, inclusive, also includes a bottle 66 (FIG. 22) which is similar to the bottle 12 (FIGS. 1 to 10, inclusive). The bottle 66 includes a neck portion 67 which in provided with external circumferentially extending spirally arranged threads 68 which are interrupted at radial intervals of preferably 180° to provide slots or passageways 112 (FIG. 22).

The closure cap housing 62–63 includes a generally cylindrical-shaped body portion 69 which is provided, on its inner surface, with spirally arranged circumferentially extending threads 70, and the body portion of the closure cap housing 69 is adapted to be threaded onto the externally threaded neck portion 67–68 of the bottle 66.

As shown in FIGS. 17, 18, 19, 22, 23 and 24, the internally threaded generally cylindrical-shaped body portion 69 of the closure cap housing has a pair of slots or cut-out recesses 71 formed in the body thereof, and these slots or cut-out recesses 71 are spaced radially preferably 180° apart or at such other radial intervals as may be desired.

The generally cylindrical-shaped body portion 69 of the closure cap housing 62–63–69 embodies a top wall 72, which is formed as an integral part of the body portion 69 and, in use, extends across and closes the open end 73 of the externally threaded neck portion 67–68 of the bottle 66. The generally cylindrical-shaped body portion 69 of the closure cap housing 62–63–69 also includes an upward extension 74 of the top wall 72 and two pairs of radially arranged slots 75 and 75' are provided in the upward extension 74, these slots 75 and 75' being spaced radially 90° apart and intersecting at the center of the body portion 69 (FIGS. 20 and 21).

In addition, the body portion 69 of the closure cap housing has an annular shoulder 90 formed therein on its radially outer surface, thereby providing an annular radially outer wall surface 91 on the body portion 69 of the closure cap housing which is of reduced diameter relative to the main extent of the body portion 69 (FIG. 22).

The preferred form or embodiment of the new bottle and closure cap unit 60, as shown in FIGS. 16 to 24, inclusive, embodies retaining means, generally indicated at 76, for restraining the closure cap unit 61 and the externally threaded neck portion 67–68 of the bottle 66 from being attached to each other by the coacting threaded attaching means, namely, the external threads 68 on the bottle neck 67 (FIG. 22) and the complementary internal threads 70 on the body portion 69 of the closure cap housing unless and until the restraining means is moved into attaching position under the control of manually operable control means therefor, as will be described hereinafter.

The restraining means 76 includes a restraining member, generally indicated at 113, which includes a top wall 77 having a depending annular flange 94. The restraining member 113 also includes a pair of depending restraining arm members 78 each of which is provided on its inner surface with spirally arranged threads 79 which are adapted to engage and mate with the spirally arranged circumferentially extending threads 70 on the inner surface of the generally cylindrical-shaped body portion 69 of the closure cap housing 62–63–69, etc. These depending internally threaded restraining arm members 78–79 are spaced radially preferably 180° apart on the restraining member 76, or at such other radial intervals as may be desired, so they may be registered with and be movable in the slots or cut-out recesses 71 in the body portion 69 of the closure cap housing 62–63–69, etc., and in the corresponding radially spaced slots 112 which are formed by interruptions in the external threads 68 on the neck portion 67 of the bottle 66, as shown in FIG. 22. Each of the depending restraining arm members 78–79 has side walls 92 which are adapted to abut corresponding side walls 93 of the slots 71 (FIGS. 17, 18 and 19).

As shown in FIGS. 17, 18, 19, 22, 23 and 24, the top wall 77 of the restraining member 113 has an upwardly extending centrally arranged boss 80 formed integrally therewith, and this boss 80 has an upwardly opening central recess 81 formed therein which is adapted to receive the shank 82 of a headed rivet 83 which is mounted centrally in the flexible, resilient top wall 63 of the portion 62 of the closure cap housing 62–63–69, etc. In use, the shank 82 of the rivet 83 is cemented or otherwise adhesively fastened in the recess 81 of the boss, by means of any suitable adhesive cement, or the like.

The preferred form of the invention embodied in FIGS. 16 to 24 inclusive, embodies manually operable control means, generally indicated at 84 (FIGS. 16, 17, 18, 21, 22, 23 and 24), for controlling the operation of the restraining means 76. This manually operable control means 84 comprises a generally cylindrical shaped or annular control member 85 which is open at its upper and lower ends and, in use, is disposed between the cap or top portion 22 of the closure cap housing 62–63–69, etc., and attached restraining member 113, and the generally cylindrical-shaped body portion 69 of the closure cap housing 62–63–69, etc. The manually operable control member 84 embodies a flexible, resilient annular side wall 85 which forms a part of the closure cap housing 62–63–69–85, and the side wall 85 has a pair of lugs 86 formed integerally therewith on its inner wall surface, and at the top thereof. These lugs 86 are radially spaced preferably 180° apart on the annular side wall 85 of the control member 84 or at such other radial suitable intervals as may be desired, so that each of the lugs 86 may engage in and work in one of the pair of slots 75 formed in the body portion 69 of the closure cap housing. Each of the lugs 86 has an enlarged upwardly extending inner end portion 87 thereon and a notch or recess 88 is provided on the upper surface of each of the lugs 86–87.

In addition, the side wall 85 of the manually operable control member 84 has a pair of stabilizing lugs 89 formed integral therewith on its radially inner surface, adjacent the top thereof, and each of these stabilizing lugs 89 projects into and works one of the pair of slots 75' formed in the body portion 69 of the closure cap housing 62–63–69–85.

OPERATION OF THE PREFERRED EMBODIMENT SHOWN IN FIGS. 16 TO 24, INCLUSIVE

The use and operation of the preferred embodiment of the invention, as illustrated in FIGS. 16 and 24, inclusive, are as follows: The cap portion 62 of the closure cap housing 62–63–69–85 and the restraining means 76 therefor are assembled together by inserting the shank 82 of the rivet 83 into and adhesively cementing it in the recess 81 in the boss 80 which is provided on the top wall 77 of the restraining member 113 (FIG. 22). The radially inner surfaces of the depending arms 64 of the cap portion 61 of the closure cap housing are then coated with an adhesive cement, or the like, and the manually operable control member 84 for the restraining unit 76 is then positioned between the thus assembled cap portion 62 of the closure cap housing 62–63–69–85 and the restraining member 113, and the generally cylindrical-shaped body portion 69 of the closure cap housing 62–63–69–85. The depending radially spaced arms 64 of the cap portion 62 of the closure cap housing 62–63–69–85 are then adhesively or otherwise suitably fastened to the radially inwardly offset outer wall surface 91 of the generally cylindrical-shaped body portion 69 of the closure cap housing 62–63–69–85.

The closure cap unit 61, thus assembled, may then be attached to the externally threaded neck portion 68–67 of the bottle 66 as follows: This is accomplished by holding the bottle 66–67 in one hand and the closure cap unit 61 in the other hand, and inserting the neck portion 67–68 of the bottle 66 into the internal threaded cavity on the body portion 69 of the closure cap housing 62–63–69–85. The neck portion 67–68 of the bottle is then given a partial rotation or twist by the said one hand so as to align the slots 112 in the externally threaded neck portion 68–67 of the bottle 66 with the recesses or slots 71 in the annular wall of the generally cylindrical-shaped body portion 69 of the closure cap housing and with the restraining arm members 78–79. Thereupon, while holding the bottle 66 in the said one hand, against rotational movement, manual pressure is then applied by the said other hand, simultaneously to the manually operable operating means for the restraining means 76, that is, to the flexible, resilient top wall 63 of the closure cap housing 62–63–69–85 and to those radially spaced pressure points on the radially outer peripheral surface of the flexible, resilient side wall 85 of the manually operable control means 84–85 for the restraining means 76 where the lugs 86–87 are located.

This simultaneous application of manual pressure to the flexible top wall 63 of the closure cap housing 62–63–69–85 and to the radially spaced pressure points on the flexible, resilient annular side wall 85 of the control means 84, at the points where the lugs 86–87 are located, forces the spaced lugs 86–87 radially inwardly in the radially spaced slots 75 (FIG. 21) which are formed in the top wall 74 of the generally cylindrical-shaped body portion 69 of the closure cap housing 62–63–69–85 while, at the same time, the downward manual pressure thus applied simultaneously on the flexible top wall portion 63 of the closure cap 62–63–69–85 housing forces the attached restraining arm member 78–79 downwardly. This action forces the depending annular internal flange 92 on the restraining member 76–77 into the notches or recesses 88 which are provided in the upper surfaces of the lugs 86–87, thus allowing the depending internally threaded restraining arm members 78–79 of the restraining member 113 to move downwardly in the slots 71 of the generally cylindrical-shaped body portion 69 of the closure cap housing relative to and toward the externally threaded neck portion 68–67 of the bottle 66, while also allowing the restraining arm members 78–79 to move downwardly into the corresponding slots 112 in the externally threaded neck portion 67–68 of the bottle 66. This downward movement of the depending restraining arm members 78–79 brings the internal threads 79 thereon into registry and mating relationship with the internal threads 70 on the generally cylindrical-shaped body portion 69 of the closure cap housing 62–63–69–85 so that the internal threads 70 in the body portion of the closure cap housing and bridge the slots 71 in the threads 70 in the internal cavity in the body portion 69 of the closure cap housing 62–63–69–85.

The attachment of the closure cap unit 60 to the externally threaded neck portion 67–68 of the bottle 66 is then completed by manually giving the bottle 66 a partial rotation or twist with the said one hand while holding the closure cap unit 61 in the said other hand and continuing to apply downward manual pressure with the said other hand on the flexible top wall 63 of the cap portion 62 of the closure cap housing 62–63–69–85 and while also continuing to apply manual pressure with the said other hand to the radially spaced "pressure points" on the flexible, resilient, annular side wall of the control member 84 where the lugs 86 are located. Release of the manual pressure on the flexible top wall 63 of the cap portion 62 of the closure cap housing 62–63–69–85 will then cause the flexible, resilient top wall 63 to return to its normal position, as in FIGS. 16, 17 and 18, under the force of its own innate resiliency while, at the same time, release of the manual pressure at the radially spaced pressure points "corresponding to the location of the lugs 86—86" on the flexible, resilient annular side wall 85 of the manually operable control member 84 will cause the said flexible, resilient annular side wall 85 of the manually operable control member 84 to return, under the force of its own inmate resiliency, from the position in which it is shown in FIGS. 19 and 24 to its normal position, as shown in FIGS. 16, 17, 18 and 23.

When the depending annular flange 94 on the restraining member 76–77 is depressed into the notches or recesses 88 in the lugs 86–87, as described above, the annular flange 94 also engages the stabilizing lugs 89 which are formed on the radially inner surface of the side wall 85 of the manually operable control member 84, and this engagement of the parts 94–89 prevents rocking motion of the assembled closure cap unit 61 and restraining means 76 therefor relative to the manually operable control member 84.

Thus it will be noted that when the parts are disposed in their normal position, as in FIGS. 16, 17, 18 and 23, and the closure cap unit 61 is mounted on the threaded neck portion 67–68 of the bottle 66, the closure cap unit 61 cannot be removed from the extremely threaded neck portion 67–68 of the bottle 66 for the reason that the internal threads 79 on the internally threaded restraining arm members 78 are at this time disposed out of registry with the internal threads 70 on the generally cylindrical-shaped body portion 66 of the closure cap housing 62–63–69–85. Hence, with the closure cap unit 61 attached to the threaded neck portion 67–68 of the bottle 66, any attempt to remove the closure cap unit 61 from the neck portion 67–68 of the bottle 66, by rotating the closure cap unit 61 and the bottle 66 relative to each other, is prevented by engagement of the side wall surfaces or edges 92 on the depending restraining arm members 73–76 (FIGS. 17, 18, 19, 23 and 24), with the adjacent side walls 93 of the slots or recesses 71 in the annular wall of the generally cylindrical-shaped body portion 69 of the closure cap housing 62–63–69–85.

Hence, in order to remove the new closure cap unit 61 from the externally threaded neck portion 67–68 of the bottle 66 it is necessary, while holding the bottle 66 in the said one hand, to apply manual pressure with the said other hand simultaneously on the flexible top wall 63 of the closure cap housing 62–63–69–85 in order to bring the internal threads 79 on the restraining arm members 78 into registry and mating relationship with the internal threads 70 in the body portion 69 of the closure cap housing 62–63–69–85 while also applying manual pressure with the said other hand on the "pressure points" on the radially outer surface of the flexible, resilient side wall 85 of the restraining member 84 where the lugs 86–87 are located. The closure cap unit 61 may then be unscrewed from the externally threaded neck portion 67–68 of the bottle 66 by imparting a partial rotational movement or twist to the bottle 66 with the said one hand, as describe above.

DESCRIPTION OF THE EMBODIMENT SHOWN IN FIGS. 25 TO 33, INCLUSIVE

Another modification of the invention is illustrated in FIGS. 25 to 33, inclusive, of the drawings and will now be described.

The form of the invention illustrated in FIGS. 25 to 33, inclusive, is similar, in part, to the preferred form and embodiment of the invention illustrated in FIGS. 16 to 24, inclusive, but differs therefrom in the construction of the neck portion of the bottle; in the construction of the closure cap unit; and in the construction of the coacting attaching means for detachably attaching the closure cap unit to the neck portion of the bottle. However, those parts in the form of the invention illustrated in FIGS. 25 to 33, inclusive, which are similar to or correspond, in general, to the parts in the preferred form of the invention illustrated in FIGS. 16 to 24, inclusive, have been given the same reference numerals followed by the additional and distinguishing reference character a.

Thus, in the form of the invention illustrated in FIGS. 25 to 33, inclusive, the restraining unit or member 113a differs from the restraining member 113 embodied in the preferred form of the invention illustrated in FIGS. 16 to 24, inclusive, in that the member 113a forms a part of the coacting attaching means between the neck portion of the bottle and the closure cap unit for detachably attaching the closure cap unit 1a to the neck portion 98 of a bottle, as 99, while, at the same time, the restraining member 113a serves as a part of the means for restraining the closure cap unit 61a from the being moved into and out of assembled relationship with or attachment to the neck portion 98 of the bottle 99, as will be described more fully hereinafter.

Thus, the restraining member 113a embodies a pair of depending attaching arm members 94 each of which has an angularly inwardly extending lower end portion 95, but the attaching and restraining arm members 94–95 differ from the restraining arm members 78–79 which are embodied in the preferred form of the invention shown in FIGS. 16 to 24, inclusive, in that the internal surfaces of the depending attaching and restraining arm members 94–95 are not internally threaded as are the restraining arm members 78–79.

The form of the invention illustrated FIGS. 25 to 33, inclusive, also differs from the preferred form of the invention shown in FIGS. 16 to 24, inclusive, in that in the form of the invention illustrated in FIGS. 25 to 33, inclusive, the neck portion 98 of the bottle 99 has molded integrally therewith a portion 104 of reduced diameter, relative to the main extent of the neck portion 98 of the bottle 99. The neck portion 98 of the bottle 99, shown in FIGS. 25 to 33, inclusive, has a pair of bayonet slots formed therein at radially spaced intervals of preferably 180° or at such other radical intervals as may be suitable and desired. Each of these bayonet slots includes a vertically extending portion 100 and these vertically extending portions 100 of the bayonet slots are adapted to be registered with the slots 71a in the side wall of the body portion 69a of the closure cap unit 61a when the closure cap unit 61a is arranged on the neck portion 98–104 of the bottle 99, as will be described more fully hereinafter.

Each of the vertically extending portions 100 of the bayonet slots 100–101–102–103–105 in the neck portion 98 of the bottle 99 opens at its lower end into a transversely extending portion 101 which has a top wall 102 from the inner end of which an arm 103 depends. Each of these arms 103 provides a restricted throat or passage 105 (FIG. 25) between the vertical extending portions 100 and the transevrsely extending portions 101–102 of the bayonet slots 100–101–102–103–105.

In the form of the invention illustrated in FIGS. 25 to 33, inclusive, the coacting attaching means for attaching the closure cap unit 61a to the neck portion 98–104 of the bottle 99, includes the bayonet slots 100–101–102–103–105 and the depending attaching and restraining arm members 94–95 of the restraining unit 76a.

In the form of the invention shown in FIGS. 25 to 33, inclusive, the closure cap unit 61a is assembled externally of the neck portion 98–104 of the bottle 99 whereupon the parts appear as in FIG. 33. However, the closure cap unit 61a cannot be mounted externally of the neck portion 98–104 of the bottle 99 until the manually operable control members in the form of the flexible resilient top wall 63a of the closure cap housing 62a–63a–69a and 85a is manually depressed while, at the same time, and with the same hand (while holding the bottle 99 against rotational movement with the other hand) the manually operable control members in the form of the flexible resilient side wall portions 86a of the closure cap housing 62a–63a–69a–85a are manually pressed inwardly to enable the depending annular flange 88a on the top wall 77a of the restraining member 113a to move into the recesses 88a. This action enables the depending attaching arms 94–95 to move downwardly in the slots 71a in the side wall of the body portion 69a of the closure cap housing 62a–63a–69a–85a. During this operation the vertically extending slots 71a in the side wall of the body portion 69a of the closure cap housing 62a–63a–69a–85a are disposed in registry with the vertically extending portions 100 of the bayonet slots 100–101–102–103–105 in the neck portion 98 of the bottle 99. Thereupon, while still pressing inwardly on the flexible resilient top wall 63a and on the flexible resilient side wall 86a of the closure cap housing 62a–63a–69a–85a with the said one hand, the bottle 99 and its neck portion 98–104 are manually given a partial rotation or twist by the said other hand of the operator; thereby moving the angularly inwardly extending lower end portions 95 of the attaching and restraining arm members 94–95 into the bayonet slots 100–101–102–103–105 and thus attaching the closure cap unit 61a to the neck portion 104 of the bottle 99.

When the neck portion 98–104 of the bottle 99 and the closure cap units 61a are thus assembled and attached together the closure cap unit 61a cannot be removed from the neck portion 98–104 of the bottle 99 until the operator (while holding the bottle 99 in one hand) manually presses, downwardly on the flexible resilient top wall portion 63a of the closure cap unit 61a while, at the same time, and with the same hand, manually pressing inwardly on the flexible resilient control portions 84a of the flexible resilient side wall of the control unit 84a. This action moves or flexes the manually operable control member 84a–85a radially inwardly to enable the annular flange 94a on the top wall 77a of the cap portion 62a of the closure cap housing to move downwardly into the recesses 88a formed in the manually operable control members 86a–87a, whereupon continued manual pressure applied to the flexible, resilient top wall 77a of the combination restraining and attaching means 76a causes the attaching arm members 94–95 to move downwardly in the registered slots 71a and in the vertically extending portions 100 of the bayonet slots 100–101–102–103–105 in the neck portion 98 of the bottle 99.

Thereupon, with the other hand, the operator imparts a reverse partial rotational movement or twist to the bottle 99 and its neck portion 98–104, thereby causing the lower end portions 95 of the attaching arms 94 to move out of the transverse extending portions 101 of the bayonet slots 100–101–102–103–105, through the restricted passages or throats, and into the vertically extending portions 100 of the bayonet slots while, at the same time, the attaching arms 94–95 of the combination attaching and restraining means 76a move into registry with the vertically extending slots 71 in the side wall of the body portion 69a of the closure cap housing 62a–63a–69a–85a. The complete closure cap unit 61a may then be manually removed from the neck portion 98–104 of the bottle 99.

It will be noted that in the form of the invention illustrated in FIGS. 25 to 33, inclusive, the combination attaching and restraining unit or member 113a and its depending arms 94–95 serve, with the bayonet slots 100–101–102–103–105 in the neck portion 98 of the bottle 99, as coacting attaching means for attaching the closure cap unit 61a to the neck portion 98–104 of the bottle 99, and that the combination attaching unit or member 113a also serves or coacts with the slots 71a and the side wall portions 2a thereof in the body portion 69a of the closure cap housing 62a–63a–69a–85a as restraining means to restrain movement of the closure cap unit 61a into and out of assembled and attached position on the neck portion 98–104 of the bottle 99.

It will thus be seen that the several forms of the new combination bottle and closure cap unit therefor hereinbefore described provide a combination bottle and closure cap unit therefor the use with liquid and solid medicines, tablets, including aspirin, pills, capsules, drugs, etc., which effectively prevents opening thereof by small children since the construction and arrangement of the parts in the several forms of the invention are such that the closure cap unit cannot be removed from the neck portion of the bottle without the use of both hands simultaneously whereas, as is well-known, small children cannot ordinarily use both hands simultaneously to perform such an operation.

It will thus be seen from the foregoing description, considered in conjunction with the accompanying drawings, that the present invention provides a new and improved combination bottle and closure cap unit therefor having the desirable advantages and characteristics and accomplishing its intended objects including those hereinbefore pointed out and others which are inherent in the invention.

I claim:

1. A combination bottle and closure cap unit therefor comprising
   (a) a bottle including a body having a neck portion;
   (b) the said closure cap unit including
      (1) a closure cap housing removably mounted on the said neck portion of the said bottle and including
         (a) a top wall;
         (b) a side wall portion; and
         (c) a body portion having therein
            (1) an internal cavity for the reception of the said neck portion of the said bottle;
   (c) the said closure cap unit and the said neck portion of the said bottle including coacting attaching means for detachably attaching the said closure cap unit and the said neck portion of the said bottle together and for rotational movement relative to each other;
   (d) the said closure cap unit including
      (1) means for restraining rotational movement of the said closure cap unit on and relative to the said neck portion of the said bottle when the said closure cap unit and the said bottle are attached together by the said coacting attaching means;
      (2) manually operable operating means for the said restraining means normally retaining the said restraining means in effective position to prevent rotational movement of the said closure cap unit and the said bottle relative to each other and for manually moving the said restraining means relative to the said body portion of the closure cap housing and the said neck portion of the said bottle into ineffective or released position to enable the said closure cap unit and the said bottle to be rotationally moved relative to each other; and
      (3) manually operable control means for the said restraining means movably mounted in the said closure cap housing for limited movement relative to the said closure cap housing and normally preventing movement of the said restraining means by the said manually operable operating means therefor but being movable by manual pressure applied thereto into position to enable the said restraining means to be moved relative to the said body portion of the said closure cap housing into ineffective or released position to enable the said closure cap unit and the said bottle to be rotationally moved relative to and separated from each other.

2. A combination bottle and closure cap unit therefor as defined in claim 1 in which the said manually operable operating means for the said restraining means includes
   (a) a manually operable operating member in the said top wall of the said closure cap housing.

3. A combination bottle and closure cap unit therefor as defined in claim 1 in which the said closure cap housing includes
   (a) a manually operable operating member in the said top wall of the said closure cap housing; and in which the said manually operable control means for the said restraining means includes
   (b) manually operable control members movably mounted in the said side wall portion of the said closure cap housing and arranged at radially spaced intervals thereon.

4. A combination bottle and closure cap unit therefor, as defined in claim 1 in which
   (a) the said bottle includes an externally threaded neck portion; and in which
   (b) the said body portion of the said closure cap has
      (1) an internally threaded cavity therein for the reception of the said externally threaded neck portion of the said bottle; and in which
   (c) the said restraining means includes threaded means normally restraining the said internally threaded internal cavity in the said body portion of the said closure cap housing and the said externally threaded neck portion of the said bottle from being moved into mating threaded relationship with each other.

5. A combination bottle and closure cap unit therefor as defined in claim 3 in which the said manually operable control members movably mounted in the said side wall of the said body portion of the said closure cap housing are spaced at approximately 180° intervals radially thereon.

6. A combination bottle and closure cap unit therefor as defined in claim 3 which includes
   (a) resilient means normally urging the said manually operable operating member for the said restraining means axially outwardly and upwardly relative to the said top wall of the said closure cap housing; and
   (b) resilient means normally urging the said manually operable control members radially outwardly relative to the said side wall of the said closure cap housing.

7. A combination bottle and closure cap unit therefor as defined in claim 4 in which
   (a) the said restraining means includes a restraining member movably mounted in the said closure cap housing, and including
      (1) a pair of radially spaced internally threaded depending restraining arm members; and in which
   (b) the said internally threaded cavity in the said body portion of the said closure cap housing includes circumferentially extending threads on the inner surface thereof having circumferentially spaced axially extending interruptions therein providing
      (1) first slots for the passage axially therethrough of the said internally threaded radially spaced depending arm members of the said restraining member; and in which the said externally threaded neck portion of the said bottle includes
      (2) circumferentially extending external threads provided with circumferentially spaced interruptions forming second slots adapted to be aligned with the said first slots in the said internal threads of the said internally threaded cavity of the said body portion of the said closure cap housing for the passage of the said depending internally threaded restraining arm members axially through the said aligned first and second slots.

8. A combination bottle and closure cap unit therefor as defined in claim 7 in which
   (a) the said body portion of the said closure cap housing includes a transversely extending top wall having openings therein for the passage of the said internally threaded depending restraining arm members.

9. A combination bottle and closure cap unit therefor as defined in claim 4 in which each of the said internally threaded depending restraining arm members has
(a) a slot extending transversely therethrough; and in which the said manually operable control means includes
(b) manually operable control members in the said side wall portion of the said closure cap housing and each having
(1) a radially inner end portion extending through and slidably mounted in one of the said transversely extending slots in one of the said depending internally threaded restraining arm members.

10. A combination bottle and closure cap unit therefor as defined in claim 9 which includes
(a) resilient means in the said closure cap housing normally urging the said restraining means axially upwardly and outwardly relative to the said top wall of the said closure cap housing; and
(b) resilient means normally urging the said manually operable control means for the said restraining means radially outwardly relative to the said side wall portion of the said closure cap housing.

11. A combination bottle and closure cap unit therefor comprising
(a) a bottle including a body having an externally threaded neck portion;
(b) a closure cap housing including
(1) a flexible, resilient top wall portion;
(2) flexible, resilient side wall portions;
(3) a body portion having therein
(a) a generally cylindrical internally threaded cavity for the reception of the said externally threaded neck portion of the said bottle;
(c) restraining means operatively connected to the said flexible resilient top wall portion of the said closure cap housing for limited movement axially of the said closure cap housing and for rotational movement with the said closure cap housing circumferentially into threaded engagement with the said externally threaded neck portion of the said bottle;
(d) the said closure cap unit including
(1) manually operable control means operatively connected to and under the control of the said flexible, resilient side wall portions of the said closure cap housing for preventing axial and circumferential movement of the said restraining means relative to the said internally threaded cavity in the said body portion of the said closure cap housing relative to the said externally threaded neck portion of the said bottle.

12. A combination bottle and closure cap unit therefor as defined in claim 11 in which
(a) the said manually operable control means for the said restraining means includes
(1) manually operable control members integrally attached to and radially spaced on the said flexible side wall portions of the said closure cap housing.

13. A combination bottle and closure cap unit therefor as defined in claim 12 in which each of the said manually operable control members has
(a) an enlarged inner end portion or head thereon; and in which
(b) each of the said internally threaded depending restraining arm members includes
(1) an upper wall portion having therein
(a) a recess for the reception of the said enlarged inner end portion or head of one of the said manually operable control members.

14. A combination bottle and closure cap unit therefor comprising
(a) a bottle including
(1) a neck portion;
(b) a closure cap unit including
(1) a closure cap housing detachably and rotatably mounted on the said neck portion of the said bottle;
(c) the said closure cap housing including
(1) a generally annular side wall including
(a) radially spaced, flexible, resilient side wall portions;
(b) a top wall including a flexible, resilient top wall portion;
(d) coacting threaded attaching means on the said neck portion of the said bottle and in the said closure cap housing for threadedly and detachably attaching the said closure cap unit to the said neck portion of the said bottle;
(e) the said closure cap unit including
(1) manually operable restraining means operatively connected to and under the control of the said flexible, resilient top wall portion of the said closure cap housing for restraining relative rotational movement between the said closure cap unit and the said neck portion of the said bottle by the said threaded coacting attaching means; and
(f) manually operable control means including manually operable control members radially spaced on the said generally annular side wall of the said closure cap housing and operatively connected to the said radially spaced flexible, resilient side wall portions of the said closure cap housing for preventing movement of the said restraining means independently of the said manually operable control means.

15. A combination bottle and closure cap unit therefor as defined in claim 14 in which the said flexible, resilient side wall portions of the said closure cap housing are radially spaced approximately 180° apart on the said side wall of the said closure cap housing.

16. A combination bottle and closure cap unit therefor as defined in claim 14 in which
(a) the said coacting threaded attaching means on the said neck portion of the said bottle and in the said closure cap housing have
(1) axially extending radially spaced interruptions therein providing
(a) aligned axially extending slots; and in which the said restraining means includes
(b) a restraining member having
(1) radially spaced depending restraining arm members having internal threads thereon and operatively connected to and under the control of the said flexible, resilient top wall portion of the said closure cap housing and adapted to be moved by the said flexible, resilient top wall portion of the said closure cap housing, under the control of the said manually operable control members, axially in the said aligned slots so as to move the said internal threads on the said restraining members into and out of mating threaded engagement with the said coacting threaded attaching means on the said closure cap housing and on the said neck portion of the said bottle.

17. A combination bottle and closure cap unit therefor as defined in claim 16 in which
(a) the said aligned slots in the said neck portion of the said bottle and in the said side wall of the said closure cap housing are radially spaced relative to the circumference of the said neck portion of the said bottle and the said closure cap housing; and in which (b) the said restraining arm members are operatively connected to and are under the control of the said flexible, resilient top wall portion of the said closure cap housing and are normally held in effective or restraining position by the innate resiliency of the said flexible, resilient top wall portion of the said closure cap housing so as to retain the said internal threads on the said depending restraining arm members out of threaded mating relationship with the said threaded coacting attaching means on the said closure cap housing and on the said neck portion of the said bottle but in which the said depending restraining arm members may be manually moved by the said flexible, resilient top wall portion of the said closure cap housing, simultaneously with the application of manual pressure to the said manually operable control means, to move the said depending restraining arm members axially inwardly or downwardly in the said aligned slots and thereby move the said internal threads on the said restraining arm members into threaded mating relationship with the said coacting threaded attaching means on the said closure cap housing and on the said neck portion of the said bottle.

18. A combination bottle and closure cap unit therefor comprising (a) a bottle including
  (1) a neck portion;
(b) a closure cap unit detachably mounted on the said neck portion of the said bottle;
(c) coacting attaching means on the said neck portion of the said bottle and in the said closure cap unit for detachably attaching the said closure cap unit and the said neck portion of the said bottle together;
(d) the said closure cap unit including
  (1) manually operable restraining means for normally preventing coaction between the said coacting attaching means; and
  (2) manually operable control means for controlling movement of the said restraining means and preventing movement of the said restraining means independently of the said manually operable control means therefor.

19. A combination bottle and closure cap unit therefor as defined in claim 18 in which the said closure cap unit includes (a) a closure cap housing including
  (1) a wall having
(b) a plurality of manually movable flexible, resilient wall portions; and in which the said restraining means includes
(c) a restraining member operatively connected to and under the control of one of the said flexible wall portions of the said closure cap housing; and in which the said manually operable control means includes
  (1) a manually operable control member operatively connected to and under the control of another one of the said flexible, resilient wall portions of the said closure cap housing.

20. A combination bottle and closure cap unit therefor as defined in claim 18 in which the said closure cap unit includes (a) a closure cap housing including
  (1) a wall having
(b) a plurality of manually movable flexible, resilient wall portions; and in which the said restraining means includes
(c) a restraining member operatively connected to and under the control of one of the said flexible wall portions of the said closure cap housing; and in which the said manually operable control means includes
  (1) a plurality of manually operable control members each operatively connected to and under the control, of another one of the said flexible, resilient wall portions of the said closure cap housing.

21. A combination bottle and closure cap unit therefor as defined in claim 17 in which the said closure cap unit includes (a) a generally cylindrical closure cap housing comprising
  (1) a top wall including
    (a) a flexible, resilient top wall portion;
  (2) a side wall including a plurality of radially spaced flexible, resilient side wall portions; and in which the said restraining means includes
    (a) manually operable restraining member operatively connected to and under the control of the said flexible, resilient top wall portion of the said closure cap housing; and in which the said manually operable control means includes
    (b) a plurality of manually operable control members each of which is operatively connected to and under the control of one of the said flexible resilient side wall portions of the said closure cap housing.

22. A combination bottle and closure cap unit therefor as defined in claim 21 in which (a) the said flexible, resilient top wall portion of the said closure cap housing is centrally arranged on the said top wall of the said closure cap housing; and in which
(b) the said flexible, resilient side wall portions of the said closure cap housing are radially spaced on the said side wall of the said closure cap housing approximately 180° from each other.

23. A combination bottle and closure cap unit therefor comprising:

(a) a bottle including
  (1) a neck portion;
(b) a closure cap unit for the said bottle;
(c) the said neck portion of the said bottle having thereon
  (1) first attaching means for attachment of the said closure cap unit thereto;
(d) the said closure cap unit comprising:
  (1) a closure cap housing including
    (a) a housing wall;
  (2) second attaching means for coaction with the said attaching means on the said neck portion of the said bottle for detachably attaching the said closure cap unit to the said neck portion of the said bottle;
  (3) a first manually operable means arranged at a preselected point on the said wall of the said closure cap housing for manually moving at least a part of the said second attaching means embodied in the said closure cap unit into position for coacting attaching engagement with the said first attaching means on the said neck portion of the said bottle; and
  (4) a second manually operable means including a manually operable control member disposed at another point on the said wall of the said closure cap housing for controlling movement of the said first manually operable means.

24. A combination bottle and closure cap unit therefor as defined in claim 23 in which the said second manually operable control means includes (a) a plurality of manually operable control members located at spaced points on the said wall of the said closure cap housing.

*25. A combination bottle and closure cap unit therefor comprising:*

*(a) a bottle including*
  *(1) a neck portion;*
*(b) a closure cap for the said bottle;*

*(c) the said neck portion of the said bottle having thereon*

*(1) first attaching means for attachment of the said closure cap unit thereon;*

*(d) the said closure cap unit comprising:*

*(1) a closure cap housing including*

*(a) a housing wall;*

*(2) second attaching means for coaction with the said attaching means on the said neck portion of the said bottle for detachably attaching the said closure cap unit to the said neck portion of the said bottle; and*

*(3) a plurality of manually operable means arranged at spaced preselected points on the said wall of the said closure cap housing for manually moving the said second attaching means embodied in the said closure cap unit out of coacting attaching engagement with the said first attaching means on the said neck portion of the said bottle so as to enable the said closure cap to be removed from the said neck portion of the said bottle.*

*26. A combination bottle and closure cap unit therefor as defined in claim 25 in which the said manually operable means includes*

*(a) a plurality of manually operable control members located at points spaced radially on the said wall of the said closure cap housing.*

*27. A combination bottle and closure cap unit therefor as defined in claim 25 in which*

*(a) the said housing wall of the said closure cap hous- includes*

*(1) a generally annular side wall portion; and in which the said plurality of manually operable means are arranged at circumferentially spaced intervals on the said generally annular side wall portion of the said housing wall.*

*28. A combination bottle and closure cap unit therefor as defined in claim 27 in which the said housing wall includes*

*(a) a top wall portion; and in which the said plurality of manually operable means includes the said top wall portion of the said housing wall.*

References Cited

The following references, cited by the Examiner, are of record in the patented file of this patent or the original patent.

UNITED STATES PATENTS

| | | | |
|---|---|---|---|
| 3,372,825 | 3/1968 | Laviano | 215—9 |
| 3,426,932 | 2/1969 | Rouse | 215—9 |

GEORGE T. HALL, Primary Examiner